(12) United States Patent
Heitzenrater

(10) Patent No.: US 8,376,111 B2
(45) Date of Patent: Feb. 19, 2013

(54) TORQUE TRANSMITTING DEVICE WITH APPLY PLATE DRAIN

(75) Inventor: Scott William Heitzenrater, Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 279 days.

(21) Appl. No.: 12/817,324

(22) Filed: Jun. 17, 2010

(65) Prior Publication Data

US 2011/0308911 A1    Dec. 22, 2011

(51) Int. Cl.
*F16D 25/0638* (2006.01)

(52) U.S. Cl. .................. 192/85.4; 192/85.43; 192/85.61

(58) Field of Classification Search ................ 192/85.4, 192/85.43, 85.24, 85.61
See application file for complete search history.

(56) References Cited

U.S. PATENT DOCUMENTS

| | | | | |
|---|---|---|---|---|
| 3,747,729 A * | 7/1973 | Storer, Jr. | ................... | 192/70.28 |
| 4,040,339 A * | 8/1977 | Ivey | ............................... | 92/129 |
| 4,648,495 A * | 3/1987 | Vater et al. | ................. | 192/70.12 |
| 4,917,002 A * | 4/1990 | Pociask | ........................ | 192/85.4 |
| 2003/0168306 A1 * | 9/2003 | Gorman et al. | .......... | 192/85 AA |

\* cited by examiner

*Primary Examiner* — Richard M. Lorence

(57) ABSTRACT

A torque transmitting device having an apply/return plate or member is provided. The torque transmitting device includes a hydraulically actuated piston and a clutch pack. The plate includes an annular disc having an inner edge and an outer edge and having a first side and a second side. A plurality of tabs extend radially out from the outer edge. A plurality of drain holes are disposed through the annular disc extending between the first side and the second side and located between the outer edge and the inner edge. The plate contacts the clutch pack to engage the clutch pack when translated by the piston and hydraulic or lubrication fluid communicates through the drain holes.

15 Claims, 2 Drawing Sheets

TORQUE TRANSMITTING DEVICE WITH APPLY PLATE DRAIN

FIELD

The invention relates generally to a torque transmitting device having an apply plate drain, and more particularly to a torque transmitting device having an apply plate with lubrication drain apertures.

BACKGROUND

The statements in this section merely provide background information related to the present disclosure and may or may not constitute prior art.

A typical multi-speed automatic or hybrid transmission uses a combination of torque transmitting devices, such as clutches or brakes, to achieve a plurality of forward and reverse gear or speed ratios as well as a Neutral and a Park. Selection of speed ratios is typically accomplished by a microprocessor transmission control module that employs various vehicle parameters, for example vehicle speed, and various driver input signals, for example accelerator pedal position, to select the appropriate speed ratios. The transmission then engages a combination of the toque transmitting devices to provide the desired speed ratios.

In order to engage the torque transmitting devices, a typical automatic or hybrid transmission includes a hydraulic clutch control system that employs a hydraulic fluid to selectively actuate pistons within the torque transmitting devices and to provide lubrication to the device. Actuation of a piston in turn engages the torque transmitting elements (i.e., friction discs and metal plates) within the torque transmitting device.

Hydraulic or lubrication fluid within the torque transmitting device must drain out to return to a sump. Typically, hydraulic or lubrication fluid drain features are incorporated in the face of the piston. However, due to the large apply area of the piston, high stresses can develop in typical drain features due to the drain features interrupting the continuous hoop of the apply face of the piston. Accordingly, there is a need in the art for a torque transmitting device that operates effectively and smoothly that reduces the stresses developed on the piston while providing effective hydraulic or lubrication fluid drainage to the sump.

SUMMARY

A torque transmitting device having an apply/return plate or member is provided. The torque transmitting device includes a hydraulically actuated piston and a clutch pack. The plate or member includes an annular disc having an inner edge and an outer edge and having a first side and a second side. A plurality of tabs extend radially out from the outer edge. A plurality of drain holes are disposed through the annular disc extending between the first side and the second side and located between the outer edge and the inner edge. The plate contacts the clutch pack to engage the clutch pack when translated by the piston and hydraulic or lubrication fluid communicates through the drain holes.

In one aspect of the present invention the plurality of drain holes are radially aligned with the plurality of tabs.

In one aspect of the present invention the plurality of drain holes are disposed between the plurality of tabs and the inner edge of the annular disc.

In another aspect of the present invention the outer edge includes notches located on each side of each of the plurality of tabs.

In another aspect of the present invention an annulus is connected to the inner edge of the disc portion.

In another aspect of the present invention a plurality of springs interconnected to the plurality of tabs for translating the plate for disengaging the clutch pack.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
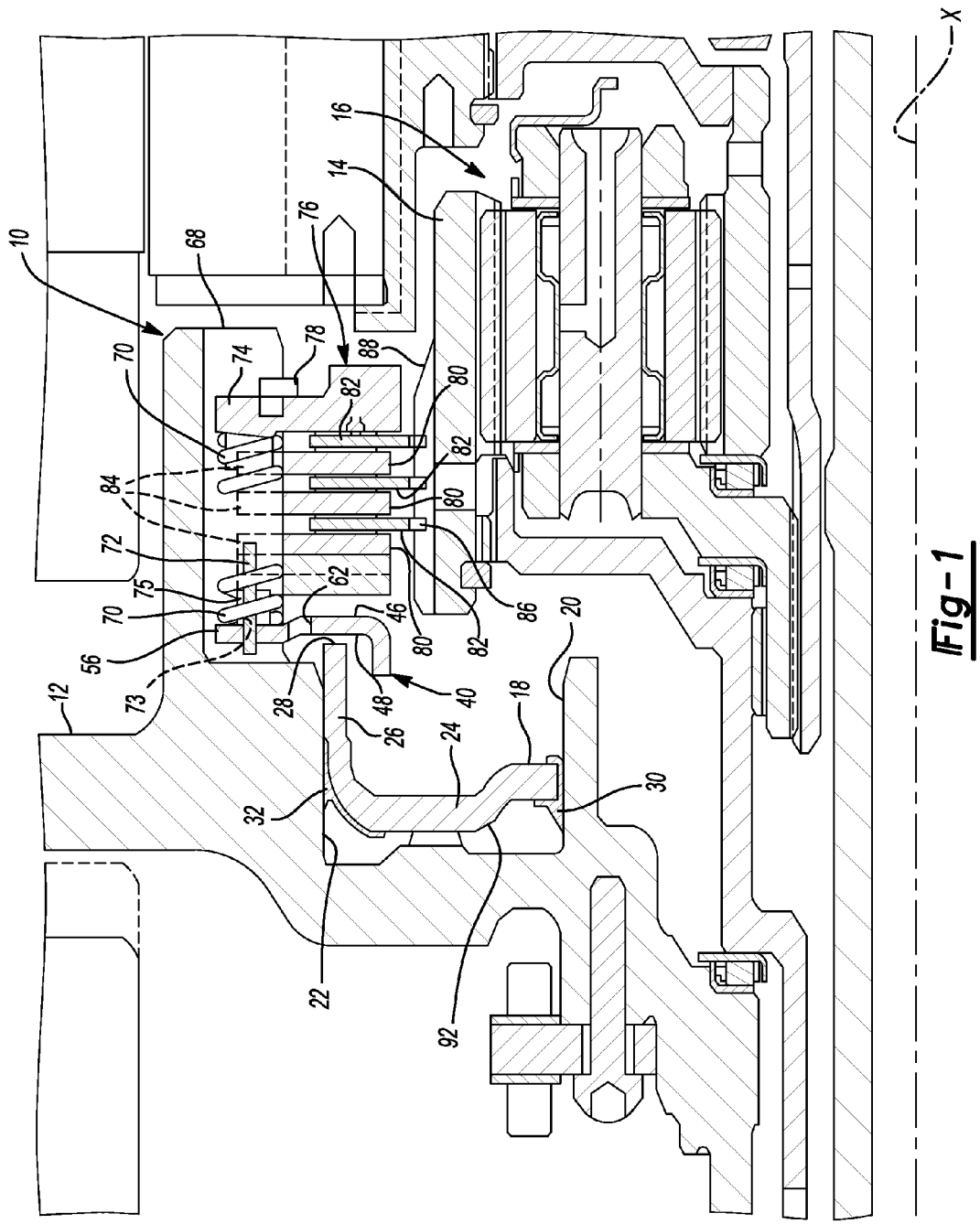
FIG. 1 is cross-sectional view of a portion of a torque transmitting device and an exemplary transmission according to the principles of the present invention.
Figure 2:
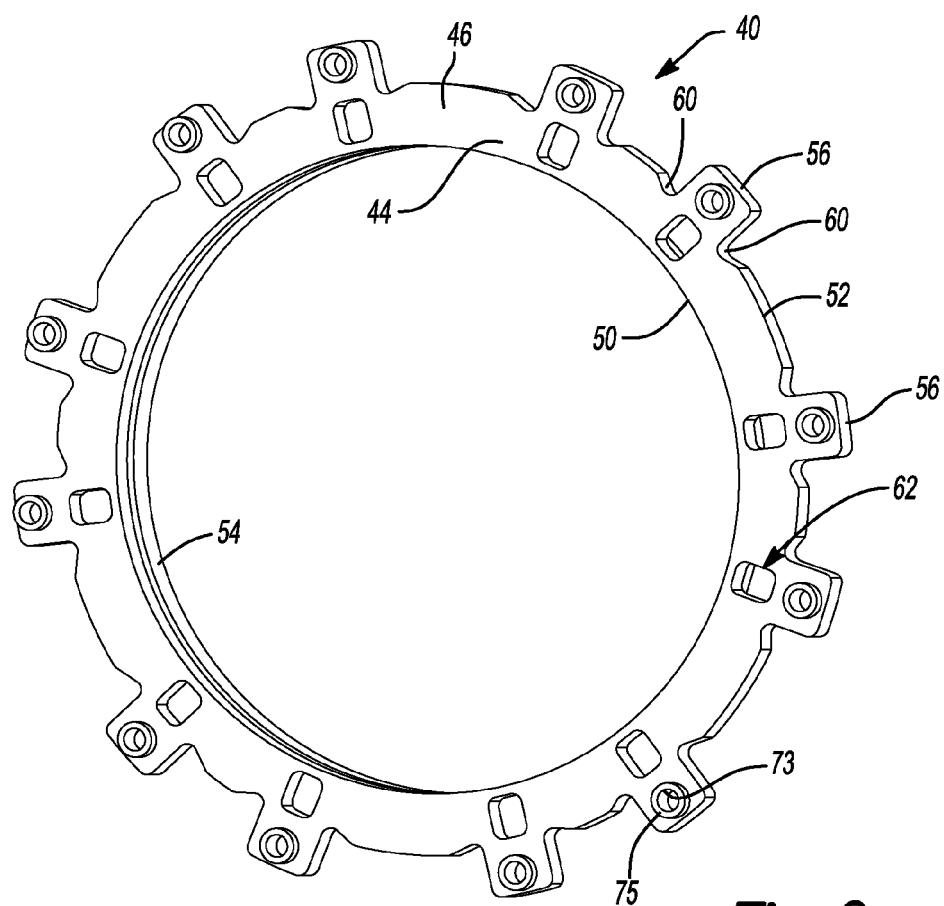
FIG. 2 is an isometric view of an apply/return plate according to the principles of the present invention.

With reference to FIGS. 1 and 2, a torque transmitting device according to the principles of the present invention is generally indicated by reference number 10. The torque transmitting device 10 is employed in the present embodiment within a transmission of a motor vehicle. The torque transmitting device 10 is operable to transmit torque between a first component 12 and a second component 14. In the example provided, the first component 12 is a stationary clutch housing and the second component 14 is a rotatable ring gear of a planetary gear set 16. However, it should be appreciated that the components 12 and 14 may be, for example, a transmission case or housing or a rotatable shaft or member, or any other component in a transmission. Accordingly, in the example provided, the torque transmitting device 10 is a clutch, though it should be appreciated that the torque transmitting device 10 may be a brake without departing from the scope of the present invention.

The clutch housing 12, the torque transmitting device 10, and the planetary gearset 16 are coaxial with one another and define an axis "X". Each of the clutch housing 12, the torque transmitting device 10, and the planetary gear set 16 including ring gear 14 are rotatable about the axis "X".

The torque transmitting device 10 is disposed within the clutch housing 12 and radially between the clutch housing 12 and the ring gear 14. The torque transmitting device 10 includes a piston 18 disposed within an annular pocket 20 formed in an inside surface 22 of the transmission case 12. The piston 18 includes a radially extending disc portion 24 and an axially extending annulus 26. Both the disc portion 24 and annulus 26 are constructed as a unitary, solid piece in the example provided. The annulus 26 terminates at a distal end or apply face 28 that faces axially towards the planetary gear set 16. The apply face 28 is annular and planar and has an uninterrupted, smooth surface. The configuration of the apply face 28 reduces the maximum stresses developed on the apply face 28 during engagement of the piston 18. Inner and outer seals 30 and 32, respectively, seal the piston 18 to the annular pocket 20. The piston 18 is hydraulically actuatable to slide or translate within the annular pocket 20 in a direction towards the planetary gear set 16 to an engaged position and to slide or translate away from the planetary gear set 16 to a disengaged position.

Figure 2A:
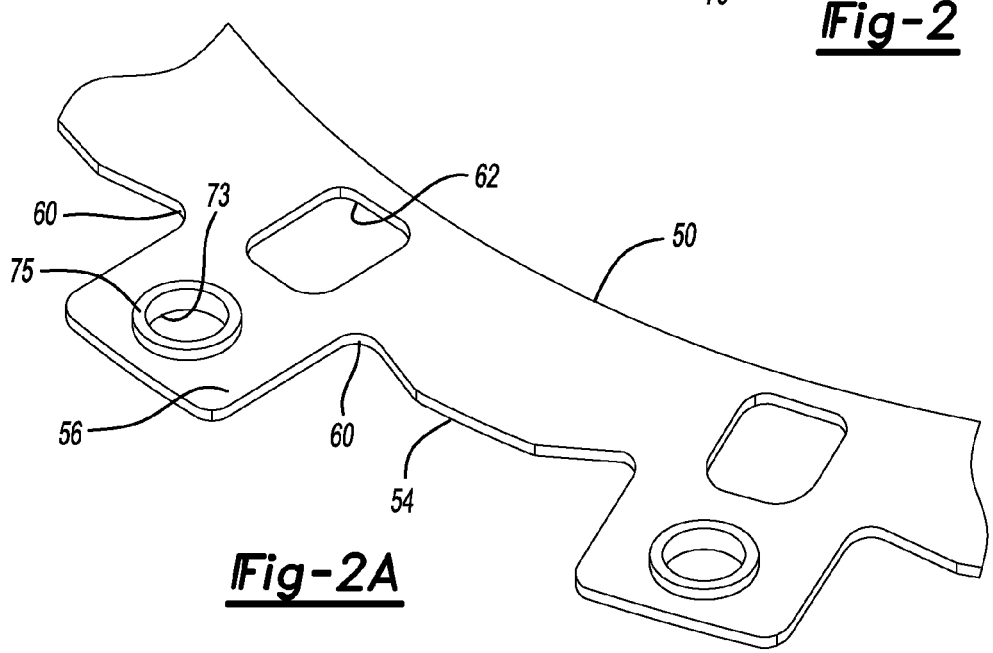
FIG. 2A is an exploded view of a portion of the apply/return plate shown in FIG. 2.

The torque transmitting device 10 further includes an apply plate 40 that is actuatable by the piston 18 to engage a clutch pack 42. Turning to FIGS. 2 and 2A and with continued reference to FIG. 1, the apply plate 40 includes a radially dispose d disc portion 44 having first and second opposing sides 46 and 48, respectively. The disc portion 44 further includes an inner edge or inner diameter 50 and an outer edge or outer diameter 52. An annulus portion 54 extends axially outwards from the inner edge 50 towards the piston 18. A plurality of tabs 56 extend radially out from the outer edge 52 of the disc portion 44. The tabs 56 are grouped in pairs and are disposed symmetrically about the outer edge 52 of the disc portion 44. Each tab 56 is operable to support a return spring 70, best seen in FIG, 1. The outer edge 52 includes an indentation or notch 60 disposed on each side of the tabs 56 at the interface between each of the tab 56 and the outer edge 52. The apply plate 40 further includes a drain feature 62 disposed on the dish portion 44. The drain feature 62 is an opening, hole, aperture, etc, that extends through the disc portion 44 between the first and second opposing sides 46 and 48. In the example provided, the apply pate 40 includes a plurality of drain features 62 where each drain feature 62 is in radial alignment with one of the tabs 56. However, it should be appreciated that other configurations of the drain features 62 may be employed without departing from the scope of the present invention. In addition each drain feature 62 is substantially rectangular in shape having curved corners, with the longest dimension of the drain feature 62 extending radially. However, it should be appreciated that other drain shape configurations may be employed without departing from the scope of the present invention, such as circular shapes, square shapes, etc. The drain features 62 allow the piston 18 to have an uninterrupted contact between the apply face 28 and the apply plate 40, thereby reducing stresses on piston 18 and reducing axial space of the torque transmitting device 10.

Returning to FIG. 1, the tabs 56 are splined with a plurality of grooves 68 disposed on the near surface 22 of the clutch housing 12. Accordingly, the apply plate 40 is rotationally fixed to the clutch housing 12 but slidable along the axis "X". The apply plate 40 supports a plurality of return springs 70 and retainer members 72 on each of the tabs 56. The retainer members 72 secure the return springs 70 to the tabs 56 of the apply plate 40 via cylindrical holes 73 surrounded by an annulus 75. It should be appreciated that the return springs 70 may be retained in any number of different ways without departing from the scope of the present invention. In the example provided, one return spring 70 connected to one tab 56, however, it should be appreciated that two return springs 70 disposed adjacent to one another may be connected to one tab 56 without departing from the scope of the present invention, The return springs 70 are in contact with a backing plate 74 of a clutch pack 76. The backing plate 74 is splined with the grooves 68 of the clutch housing 12. A retainer ring 78 secures the backing plate 74 to the clutch housing 12 and acts as a counterforce against the bias of the return springs 70 and prevents the backing plate 74 from axial translation. The return springs 70 exert a biasing force against the apply plate 40, and therefore the piston 18, in a direction away from the clutch pack 76 towards the disengaged position described above.

The clutch pack 76 is disposed radially inwardly from the clutch housing 12 and radially outwardly from the planetary gear set 16. The clutch pack 76 includes a plurality of reaction plates 80 interleaved with a plurality of friction plates 82. The reaction plates 80 include splines 84 meshed with the grooves 68 of the clutch housing 12.Therefore, the reaction plates 80 are rotationally fixed to the clutch housing 12 but are axially translatable along the axis "X" The friction plates 82 include splines 86 meshed with grooves 88 formed on an outer surface of the ring gear 14. Therefore, the friction plates 82 are rotationally fixed to the ring gear 14 but are axially translatable along the axis "X".

To engage the torque transmitting device 10, the piston 18 is actuated by a flow of pressurized hydraulic fluid on an apply side 92 of the piston 18. The piston 18 translates against the biasing force of the return springs 70 and engages the apply plate 40. The apply plate 40 in turn translates in an axial direction towards the clutch pack 76. The apply plate 40 contacts the one of the reaction plates 80 and translates the reaction plates 80 towards the friction plates 82. The reaction plates 80 and the friction plates 82 are compressed between the apply plate 40 and the backing plate 74, thereby coupling the clutch housing 12 to the ring gear 14. As the apply plate 40 translates, hydraulic fluid within the clutch pack 74 flows through the drain features 62 on the apply plate 40. This eliminates trapped hydraulic fluid during clutch pack 34 apply. To disengage the torque transmitting device 10, the apply side 92 of the piston 18 is depressurized, and the return springs 70 move the apply plate 40 and piston 18 back to the unengaged position, thereby de-coupling the clutch housing 12 from the ring gear 16.

The description of the invention is merely exemplary in nature and variations that do not depart from the gist of the invention are intended to be within the scope of invention. Such variations are not to be regarded as a departure from the spirit and scope of the invention.

What is claimed is:

1. A torque transmitting device for selectively transmitting torque between a first member and a second member, the torque transmitting device comprising;
    an apply plate translatable along an apply axis, wherein the apply plate comprises an annular disc having an inner edge and an outer edge, an aperture disposed through the annular disc radially between the inner edge and the outer edge and an annulus extending axially from the inner edge of the annular disc;
    an annular piston disposed adjacent apply plate and having an apply face that is planar, the annular piston translatable along the apply axis;
    a biasing member in operational engagement with at least one of the apply plate and the piston, the biasing member configured to translate at least one of the annular piston and the apply plate along the axis; and
    a clutch pack disposed adjacent the apply plate, the clutch pack connected to the first member and the second member, wherein the clutch pack selectively transmits torque between the first member and the second member when the apply face of the piston contacts the apply pate and translates the apply plate to engage the clutch pack and wherein torque is selectively not transmitted between the first member and the second member when the biasing member translates at least one of the apply plate and the piston to disengage the clutch pack.

2. The torque transmitting device of claim 1 wherein the apply plate includes a plurality of tabs extended radially out from the outer edge of the annular disc.

3. The torque transmitting device of claim 2 wherein the biasing member is interconnected to one of the plurality of tabs of the apply plate.

4. The torque transmitting device of claim 2 wherein the aperture is radially aligned with one of the plurality of tabs.

5. The torque transmitting device of claim 4 wherein the aperture is disposed in radial alignment between one of the plurality of tabs and the inner edge of the annular disc.

6. The torque transmitting device of claim 2 wherein the outer edge includes notches located on each side of each of the plurality of tabs.

7. The torque transmitting device of claim 1 wherein the clutch pack includes at, least one friction plate slidably connected to one of the first and second members and at least one reaction plate slidably connected to another of the first and second members.

8. The torque transmitting device of claim 1 wherein the apply face of the piston is smooth.

9. The torque transmitting device of claim 1 wherein the aperture is configured to drain hydraulic fluid when the apply plate translates along the apply axis.

10. A member within a torque transmitting device having hydraulic fluid therein, the member translatable by a piston for engaging a clutch pack, the member comprising:
- an annular disc having an inner edge and an outer edge;
- a plurality of tabs extended radially out from the outer edge, each of the plurality of tabs defining an opening; and
- a plurality of drain holes disposed through the annular disc and located between the openings in the plurality of tabs and the inner edge,
- wherein the annular disc contacts the clutch pack to engage the clutch pack when translated by the piston and wherein the hydraulic fluid communicates through at least one of the drain holes.

11. The member of claim 10 wherein the plurality of drain holes are radially aligned with the plurality of tabs.

12. The plate of claim 10 wherein the outer edge includes notches located on each side of each of the plurality of tabs.

13. The member of claim 10 further comprising an annulus extending axially from the inner edge of the annular disc.

14. The member of claim 10 further comprising a plurality of springs interconnected to the plurality of tabs for translating the member for disengaging the clutch pack.

15. A member within a torque transmitting device having hydraulic fluid therein, the member translatable by a piston for engaging a clutch pack, the member comprising:
- an annular disc having an inner edge and an outer edge;
- a plurality of tabs extended radially out from the outer edge;
- an annulus extending generally axially from the inner edge of the annular disc; and
- a plurality of drain holes disposed through the annular disc and located between the outer edge and the inner edge,
- wherein the annular disc contacts the clutch pack to engage the clutch pack when translated by the piston and wherein the hydraulic fluid communicates through at least one of the plurality of drain holes.

* * * * *